United States Patent
Ring et al.

(10) Patent No.: US 10,055,687 B2
(45) Date of Patent: Aug. 21, 2018

(54) METHOD FOR CREATING PREDICTIVE KNOWLEDGE STRUCTURES FROM EXPERIENCE IN AN ARTIFICIAL AGENT

(71) Applicant: Mark B. Ring, Anaheim, CA (US)

(72) Inventors: Mark Ring, Anaheim, CA (US); Tom Schaul, London (GB)

(73) Assignee: Mark B. Ring, Anaheim, CA (US)

( * ) Notice: Subject to any disclaimer, the term of this patent is extended or adjusted under 35 U.S.C. 154(b) by 0 days.

(21) Appl. No.: 14/689,052

(22) Filed: Apr. 17, 2015

(65) Prior Publication Data

US 2016/0012338 A1 Jan. 14, 2016

Related U.S. Application Data

(60) Provisional application No. 61/981,006, filed on Apr. 17, 2014.

(51) Int. Cl.
*G06N 5/04* (2006.01)

(52) U.S. Cl.
CPC ...................... *G06N 5/04* (2013.01)

(58) Field of Classification Search
CPC ........................................ G06N 5/04
USPC ............................................. 706/14
See application file for complete search history.

(56) References Cited

PUBLICATIONS

Degris et al ("Scaling-up Knowledge for a Cognizant Robot. AAAI Spring Symposium on Designing Intelligent Robots: Reintegrating AI., Mar. 2012").*

* cited by examiner

*Primary Examiner* — Lut Wong
(74) *Attorney, Agent, or Firm* — Innovation Capital Law Group, LLP; Vic Lin

(57) ABSTRACT

Building a forecast for an autonomous agent at least comprises assigning a selected parameter of the autonomous agent to a scalar variable, adding a new policy to a set of policies where the new policy maps internal states of the autonomous agent to actions of the autonomous agent in which the mapping may optimize the scalar variable, and adding a new forecast to a set of forecasts where the forecast at least comprises a prediction regarding future values of the scalar variable following execution of the new policy, regardless whether the agent ever actually chooses to take actions in accordance with said new policy. A state of the autonomous agent may be evaluated following completion of each of the agent's actions by comparing the agent's state information with the predicted values of one or more forecasts. Whether to build an additional forecast may be determined based on the evaluation.

20 Claims, 7 Drawing Sheets

METHOD FOR CREATING PREDICTIVE KNOWLEDGE STRUCTURES FROM EXPERIENCE IN AN ARTIFICIAL AGENT

CROSS-REFERENCE TO RELATED APPLICATIONS

The present Utility patent application claims priority benefit of the U.S. provisional application for patent Ser. No. 61/981,006 entitled "A system for creating knowledge forecasts", filed on 17 Apr. 2014 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

The following related U.S. patent application(s), submitted by at least one of the present Applicant(s)/Inventor(s) is/(are) recently co-pending:
U.S. utility patent application Ser. No. 13/907,936, entitled "A Method and System for an Intelligent Artificial Agent", submitted to the United States Patent and Trademark Office (USPTO) on 2 Jun. 2013.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to Artificial Intelligence (AI). More particularly, the invention relates to creating predictive knowledge structures from experience in an artificial agent.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that predictive methods are becoming increasingly popular for representing world knowledge in autonomous agents.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figures 1A, 1B:
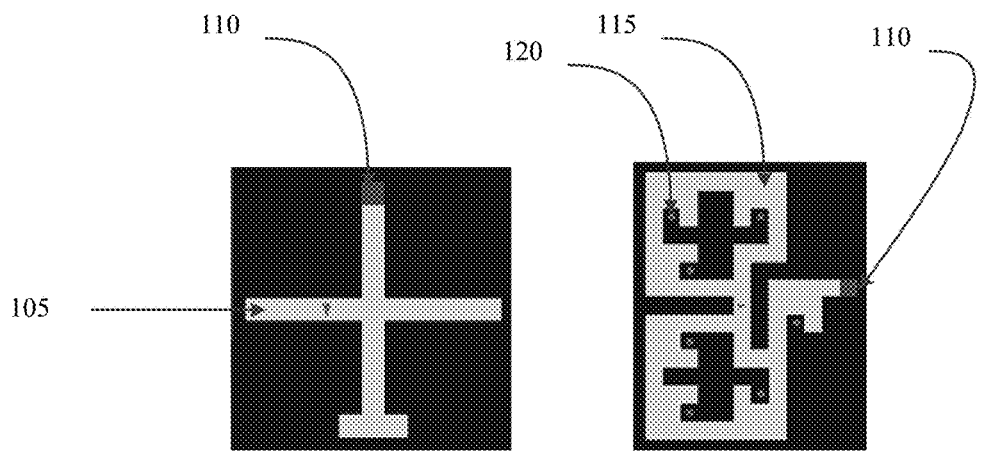
FIGS. 1a and 1b illustrate two grid worlds, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, pro-cess data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, micro-processor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to an-other over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or other-wise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and trans-mitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electro-magnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted ac-cording to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed be-sides those suggested by the tables shown. Similarly, any illustrated entries of the databases rep-resent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and COR-BA, for transport over an enterprise intranet) may be used. Any application or functionality described herein may be implemented as native code, by providing hooks into another application, by facilitating use of the mechanism as a plugin, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiment of the present invention may operate in an artificial intelligent agent, which is capable of interacting with its "world" or "environment" through its observations and actions.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" or "actions" refers to the agent's many means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations, current and/or past forecast estimates, and/or combinations and/or functions of current and/or past observations and/or forecast estimates.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function.

A simple, but non-limiting, example of such an agent is a robot, which may perceive its environment by making observations through sensors such as, but not limited to, cameras, tactile sensors, microphones, range finders, etc., and which may affect its world by taking actions by way of actuators that may control the force or velocity of, without limitation, joints, appendages, wheels, servos, controls or related mechanisms.

"Forecasts" or "General Value Functions" (GVFs) may provide structures for representing knowledge in an artificial intelligent agent in terms of predictions, and methods for learning/tuning this knowledge through experience. Some embodiments of the present invention may provide for methodical mechanisms for the automatic construction of these structures. Some embodiments of the present invention may construct these structures automatically, particularly when the structures are related hierarchically, such that hierarchical dependencies may allow automated acquisition of deep knowledge structures from experience. Some embodiments of the present invention may mitigate a problem of excessive construction/generation of these knowledge structures through a pruning of ineffective components, such as, without limitation, ineffective forecasts/GVFs and/or policies.

Some embodiments of the present invention may limit the kind of "forecasts" or "GVFs" that are considered, and then may iteratively create all possible instances within these constraints in a hierarchical fashion, and then may prune away unnecessary/ineffective forecasts/GVFs. In accordance with the teaching herein, other methods may become readily apparent to one skilled in the art and are contemplated herein.

Some embodiments of the present invention may provide methods that may allow the automatic construction of "forecasts" or "GVFs" by an artificial agent through experience and interaction with its environment. GVFs or forecasts may be generally described as a combination of a "policy" (a mapping from the agent's representation of its state to a probability distribution over its available actions), optionally combined with starting and stopping criteria; and prediction criteria (mappings from the agent's representation of state to long-term predictions of the results of following the policy, with or without the starting and stopping criteria). The exact form of the forecasts/GVFs is not limited and the present invention should be understood to be applicable to a broader description of forecasts/GVFs.

Forecasts/GVFs may provide a structure for representing predictive knowledge in an artificial agent with parameters that may be tuned based on experience. Some embodiment of the present invention may provide for automating the process of choosing which forecasts/GVFs the agent should have, such as, without limitation, for the construction of hierarchically related forecasts/GVFs and/or policies. Automatically constructing hierarchical forecasts/GVFs and related policies may allow a designer/trainer of the agent less involvement in the training/learning process. Automatically creating forecasts/GVFs, particularly hierarchically organized forecasts/GVFs, may result in the automatic discovery by the agent of predictive knowledge in general; in the hierarchical case, the depth, extent, and corresponding time span of this knowledge may be potentially unlimited. In some embodiments pruning of ineffective forecasts/GVFs may be useful for reducing the computational overhead of the forecasts.

Some embodiments automate the construction/generation of forecast/GVF hierarchies, where for example, without limitation, higher-level forecasts/GVFs and/or policies are built to estimate/predict and/or optimize (respectively) values calculated by lower-level forecasts/GVFs. To generate higher-level forecasts it may be useful to build policies that optimize the values of specific observation signals and/or forecast/GVF predictions/estimates already created and/or any combination of observation signals and forecast/GVF predictions/estimates, and build new forecasts/GVFs to estimate/predict possible results of executing/following the policies (e.g., by estimating the probability that the agent will perceive a particular observation signal and/or existing forecast/GVF value, and/or any combination of observation signals and existing forecast/GVF values in the future if executing/following said policies).

One of the goals of AI is a continual-learning agent, capable of constantly extending its skills and its understanding of its world, building step by step on top of what it has already learned. Such an agent may require a method for capturing and representing the important features and regularities of its sensorimotor stream. Prediction has emerged as a particularly powerful principle for organizing knowledge and skills, focusing the agent's representational efforts on making and testing verifiable hypotheses about the consequences of its actions. GVF may offer a rich and expressive language for action-conditional prediction, resolving many of the limitations of previous predictive methods.

In a focused experimental investigation of GVFs, a narrow subclass of forecasts (GVFs) was examined for their ability to capture important regularities. Specifically they are compared to an earlier predictive method, Predictive State Representations (PSR) to decide whether forecasts may be likely to be a better method for capturing the useful features and regularities of a learning agent's environment.

While generalization in static, supervised-learning problems has been the standard measure of comparison for decades, dynamic learning problems such as robotics and reinforcement-learning tasks may be complicated by the interaction of the agent and do not admit so readily to such measures. Consequently tests for generalization are far less common.

Yet generalization may be particularly important to continual-learning agents, which may never experience more than a minuscule fraction of the states in their environments but must nevertheless capture the most useful regularities and exploit these over a potentially vast state space.

Predictive methods of state representation differ from so-called "historical" methods in that their focus is not on remembering what the agent has seen in the past, but on predicting what the agent might see in the future. PSRs are the most widely studied predictive methods, but there are others, such as, without limitation, Simple-Assignment Automata, Observable Operator Models, and TD Networks. These methods may represent the agent's state information as a set of features, each an action-conditional prediction of a future observation. A PSR feature, for example, without limitation, estimates in each state the probability of making a specific observation if the agent were to take a specific sequence of actions starting in that state.

Forecasts (GVFs) are similar to PSRs in the general sense that each feature estimates the outcome of following a specific course of behavior. But a crucial difference may be that this course of behavior is not an open-loop sequence of actions, but a closed-loop option: a mapping from states to actions (a policy) together with the conditions for the policy's initiation and termination. Thus, forecasts may be more general, more flexible, and have the ability to capture more temporally indefinite regularities than PSRs. Further enhancing their capacity for abstraction and generalization, forecasts may also be composed or layered in two ways: first, one forecast may learn to predict the (option-conditional) value of another; second, the policy learned for one may be used as the policy of another.

One advantage of forecasts may be the existence of so-called "off-policy" learning methods, allowing large numbers of them to be trained simultaneously. Each learns to make different predictions about different kinds of behavior from the agent's single stream of sensorimotor data. This vital capability may make forecasts perhaps the best existing candidate for continual learning.

Because forecasts have much in common with PSRs and TD Networks, they may be described within the framework of Markov decision processes (MDPs). An MDP consists of a set of states ($s \in S$) actions ($a \in A$), observations ($o \in O$) and rewards ($r \in R$). At every time step, the agent receives an observation $o_t$ and reward $r_t$ in its current state $s_t$ and takes action $a_t$ which leads the agent to the next state $s_{t+1}$, depending on the state transition probabilities $T(s, a, s') = Pr(s_{t+1}=s'|s_t=s, a_t=a)$.

PSRs represent each state internal to the agent as a set of features (called "tests") where each is a prediction about an observation that might result from executing a specific sequence of actions. There are several varieties of PSRs with slightly different properties. In one sufficiently general variety, a test $q(o, a^1, \ldots, a^k)$ represents the agent's probability of making a specific observation o after taking a specific string of k actions $a^1, \ldots, a^k$:

$$q(o,a^k) = Pr(o_{t+k}=o|a_t=a^1, \ldots, a_{t+k}=a^k) \qquad \text{Equation 1}$$

Short sequences of actions make short-term predictions; longer sequences make longer-term predictions. If two states are distinguishable, there will be a series of actions that can be taken in each that will result in a different expected observation. Thus, each PSR feature has two components: (1) its definition (i.e., specification of which observation should follow which sequence of actions), and (2) its value (the probability of Equation 1) in each state.

TD Networks contain a set of nodes that each make an action-conditional prediction either about an observation (as with PSRs) or about the value of another node in the network. As with PSRs, each node has two parts: a definition and a value. The definition describes or specifies what the node is making a prediction about, and the value is an estimate of the predicted quantity, which may vary from state to state, and is a learned function of the observations and features.

As with PSRs and TD Nets, a forecast or GVF also has the same two parts: a definition and a value. Forecasts are quite similar in spirit to the other two but are considerably more sophisticated, general, and flexible. Rather than making a prediction about the result of following a specific fixed sequence of actions, a forecast may predict the result of following an option until it terminates.

Each forecast definition may consist of two parts, an option and an outcome. The option is a 3-tuple ($\pi$, I, $\beta$), where $\pi$ is a policy, which maps states (as represented by the agent) to a probability distribution over actions; I: $S \rightarrow \{0,1\}$ the initiation set (specifying the states in which the policy can be started) maps states to either zero or one; and $\beta: S \rightarrow [0,1]$ is the termination probability (the probability of the option terminating in each state), which maps states to probability values between (and including) zero and one. The option describes a possible way for the agent to behave, along with conditions about where that way of behaving can begin and end. Each forecast may predict what the outcome will be if the option is followed (i.e., if the agent behaves as described by the option).

The outcome is a tuple (c,z), where c:(S×A)$\rightarrow$R is a cumulative value defined for every state-action pair reachable while the option is being followed, and z:S$\rightarrow$R is a termination value, defined wherever termination may occur.

Thus, every forecast definition $f^i$ may describe a function of the state according to these five components:

$$f^i(s) = f^{\pi^i, I^i, \beta^i, c^i, z^i}(s)$$

For clarity in the description of an individual forecast, the superscript i is now dropped.

The value of a forecast may be the expected sum of all the cumulative c values encountered while the option is being followed, plus the termination value z at option termination at some future time step k. More precisely, the forecast value for a state $s \in I$ may be:

$$f(s) = E[c_1 + c_2 + \ldots + c_{k-1} + z_k | \pi, \beta, s_0 = s] \qquad \text{Equation 2}$$

Thus, the forecast value may be a prediction about the expected sum of c values while the agent is following the option, plus the expected z value when the option terminates. To avoid infinite sums, one may constrain $\beta$ to (0,1], ensuring that all options will eventually terminate.

Although c and z can be any function of the state, one useful special case occurs when c is zero everywhere, z is binary, and $\beta=1$ wherever z=1. In this case, the forecast value may represent the agent's option-conditional probability of entry into the set of states where z is 1.

Thus, forecasts may be action-conditional predictions that are significantly more flexible than PSRs and TD Nets. In particular, the number of steps that might elapse until termination of a forecast may not be explicit in its definition, allowing the prediction of an arbitrary condition of the state within a loose time frame. In fact, forecasts may be very similar to the value function in reinforcement learning (hence the term "general value function") but may be used to predict any function of the state, not just the reward. Thus, a unique advantage of forecasts may be that their policies may be optimized to maximize or minimize the forecasted value. These forecasts may be called "active" and distinguish them from "passive" forecasts which have static policies.

Note that though "the forecast" is occasionally unambiguous, generally one must specify whether one means the forecast definition f (specification of the option and outcome) or the forecast's ideal value f(s) (Equation 2). And besides these, there is also the agent's estimate of the ideal value $\hat{f}(s)$, because, just as with PSRs and TD Nets, the learning agent must learn the values of those predictions.

In the focused experimental investigation of GVFs only those cases are considered where: I=S (all policies can be initiated in all possible states), c(s)=0 (there is no cumulative value in the outcome), $z(s) \in \{0,1\}$, and $\beta(s)=1$ if $z(s)=1$ but $\beta(s)=0.1$ otherwise, for all $s \in S$. Therefore, the experimental investigation considers the case where the forecast estimates the probability of terminating in a state s where $z(s)=1$, and thus the value of the forecast is inversely related to the number of steps the agent needs to reach such a state. Batch methods were used to compute the ideal forecast values for small state sets. These batch methods assume a full model of the environment.

Forecasts were created in a canonical and automated way, from simple to complex, then the contribution of each as it is added was measured. A layered approach was chosen in which new active forecasts are added that predict and attempt to achieve values of already known features.

Forecasts were created, optimized, and evaluated in an incremental process detailed in Algorithm 1, below, starting with forecast $f^1$. For simplicity, all agent observations in all the tests are binary, and the algorithm begins with a vector of observation functions O where each function produces a binary value in each state, $o \in O: S \rightarrow \{0,1\}$. Because they are binary, one may view each observation function as describing a set of states (in which the observation is 1), and $\Psi$ is an ordered list of these sets and their complements (Line 3). Note that the "•" symbol denotes the operation of appending to a list (in the case of Line 3, appending a set of states to a list). For each forecast $f^j$ the initiation set $I^j=S$ (Line 6) and $c^j=0$ in all states (Line 8). The z values are based on $\Psi^j$, the $j^{th}$ state set in the list; specifically, $z^j(s)=1$ if and only if $s \in \Psi^j$. All forecasts are active, so policy $\pi^j$ is optimized to maximize $f^j$ according to Equation 2 (Line 15). A perfect model of the environment and full state information was used to calculate the ideal value for each forecast in each state (Line 16). The median of those ideal values then becomes a threshold (Line 17) used to split the states into two sets that are then appended to the list $\Psi$ (Line 18). Forecast creation continues until N forecasts have been created and evaluated in each state.

---

Algorithm 1: Create N forecasts

---

```
1    Ψ ← { }
2    for o in O do
3        Ψ ← Ψ · {s | o(s) = 1} · {s | o(s) = 0}
4    for j ← 1 to N do
5        create forecast f^j such that :
6            I^j = S
7            for each s ∈ S do
8                c^j(s) ← 0
9                if s ∈ Ψ^j then
10                   z^j(s) ← 1
11                   β^j(s) ← 1
12               else
13                   z^j(s) ← 0
14                   β^j(s) ← 0.1
15           π^j ← optimal policy using policy iteration
16           compute f^j(s) for all s ∈ S
17           θ = median_{s∈S} {f^j(s)}
18           Ψ ← Ψ · {s | f^j(s) < θ} · {s | f^j(s) ≥ θ}
19           delete duplicate sets from Ψ
```

The N ideal values for forecasts $f^1$ to $f^N$ form a set of features whose quality is evaluated. To evaluate a set of features as a state representation for a reinforcement-learning agent, they are combined with the agent's observations into a feature vector which is used to compute the following three measurements: (1) The mean-squared error (MSE) between the true value function $\hat{V}$ (computed with a perfect model and full state information) and $\hat{V}$, the best linear approximation of V based on the feature vector. This value is designated "MSE" in the graphs. (2) The average value of each state according to the true value function for policy $\hat{\pi}_f$, where $\hat{\pi}_f$ is the best policy that can be computed as a linear function of the feature vector. This value is designated "LSTD-PI" in the graphs. (3) Same as (1) above but $\hat{V}$ is computed using only a randomly selected fraction of the states (specifically, 50% and 90%), averaged over 25 random selections of state sets. These measurements provide an indicator of a feature set's ability to generalize to unseen parts of the state space.

FIGS. 1a and 1b illustrate two grid worlds, for training and testing an agent in accordance with an embodiment of the present invention. FIG. 1a is a cross shaped corridor 105 with 23 positions (92 states) and a reward 110 (not visible to the agent) in one of three identical-looking arms. The fourth arm can potentially be distinguished by the agent and used for orientation. FIG. 1b is an 82-position (328 state) world with 7 identical-looking rooms 115; each with two exits, one marked by a protruding wall 120 (dot invisible to the agent). In FIGS. 1a and 1b, the agent has two actions: go forward or rotate 90 degrees left ($|A|=2$). In each case, the state space consists of position and orientation, so $|S|=4p$, where P is the number of positions. The agent observes just one bit, namely whether it has a wall immediately in front of it ($|O|=1$), and is rewarded for visiting an (invisible) goal position 110. Both environments are implemented with pyvgdl an open-source, video-game description language (VGDL) in Python, which allows automatic generation of different configurations, game mechanics (stochastic or deterministic), and a full MDP model (matrix of exact transition probabilities), from a simple description.

Figure 2:
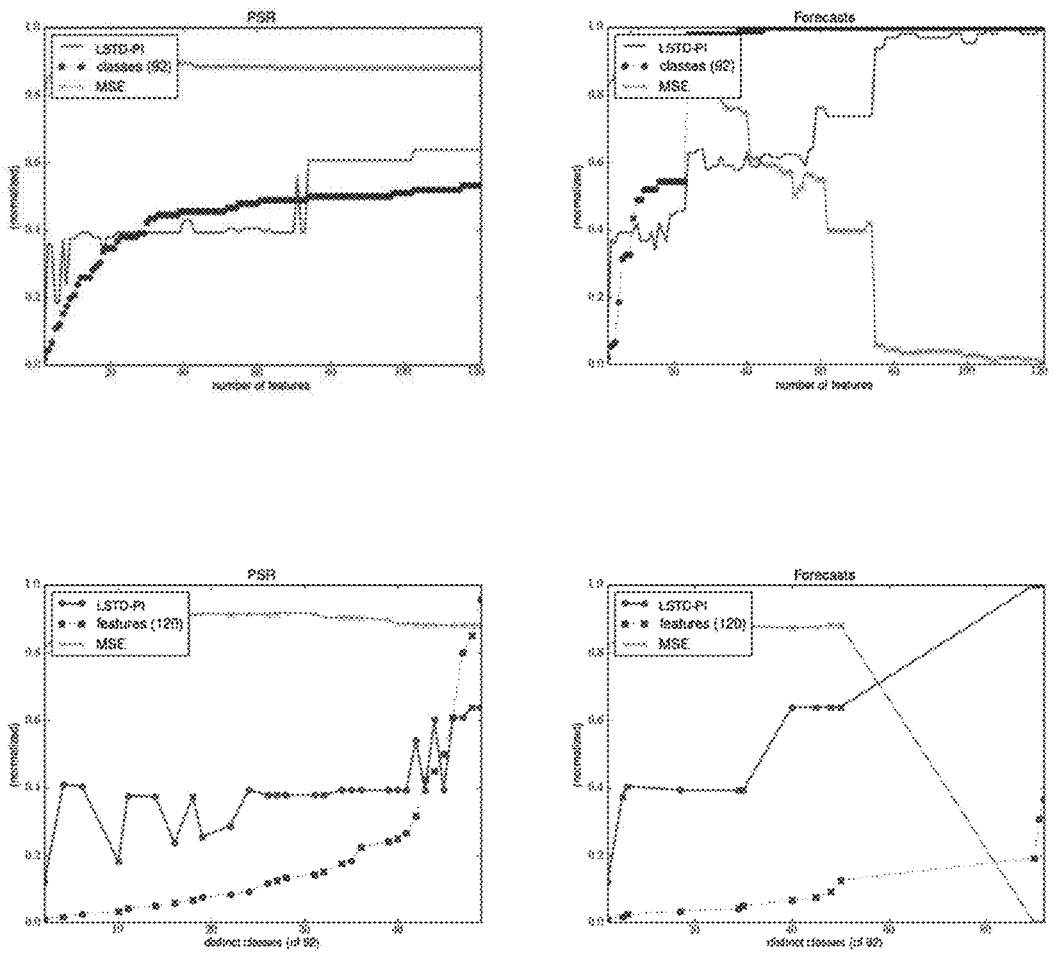
FIG. 2 illustrates quality of the 120 first features generated in the world of FIG. 1a, in accordance with an embodiment of the present invention.

FIG. 2 illustrates quality of the 120 first features generated in the world of FIG. 1a, in accordance with an embodiment of the present invention. Quality of the 120 first features generated in the cross-shaped corridor world. Left column: PSR tests; right column: forecasts. Above: The horizontal axis shows the (increasing) cumulative number of features used. Two quality measures are shown, normalized between 0 and 1: "MSE" is the mean-squared error for the best linear approximation of the optimal value function with these features, and "LSTD-PI" shows the average expected reward for the best feature-based policy averaged across all states. The violet circles indicate how many classes of states can be distinguished using the features: if this curve reaches 1, then all states can be disambiguated in principle (but not necessarily by a linear function approximator). Below: Performance curves as above but feature vectors now identify which class each state belongs to. The squares indicate the fraction of total features required to distinguish the classes.

Figure 3:
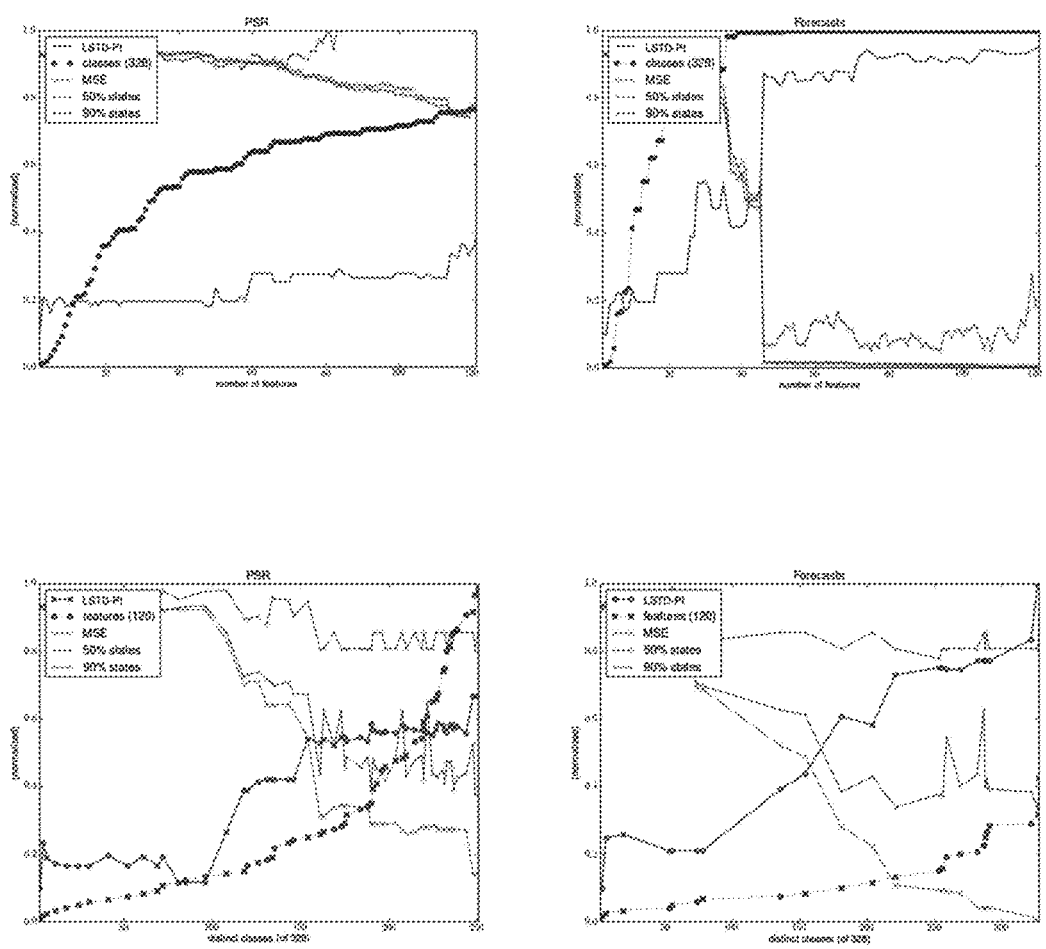
FIG. 3 illustrates generalization quality of the 120 first features in the 7-room grid world of FIG. 1b, in accordance with an embodiment of the present invention.

FIG. 3 illustrates generalization quality of the 120 first features in the 7-room grid world of FIG. 1b, in accordance with an embodiment of the present invention. PSRs (left), forecasts (right). Forecasts again drastically outperform PSRs. Generalization is measured by leaving out a fraction (10%, or 50%) of all states from the transition data used by LSTD to generate the parameters of the linear function approximator. Both curves (each the median over 25 runs) measure MSE, and should be compared to the MSE line, which is computed from complete state data.

The top graphs of FIGS. 2 and 3 show an incrementally increasing number of features, which are either forecast values (generated according to Algorithm 1), or for comparison, PSR-test values. PSR tests are generated according to a shortest-first method, in which all tests of length k (having action sequences of length k) are generated before any test of length k+1, beginning with k=1. In the lower graphs states are aggregated into as many classes as the forecasts (or PSRs) can disambiguate. That is, each state belongs to exactly one class, and two states belong to the same class if and only if they cannot be distinguished by any PSR test (left) or forecast (right). In these graphs, the feature vector consists of one binary feature per class, where each feature value is 1 in exactly those states that belong to the class. Note that sometimes multiple forecasts (or PSRs) need to be added before a new class arises. Other times a single forecast (or PSR) can produce many new classes at once (see the jump in FIG. 2 from 50 to 90 classes with just one additional forecast). FIG. 2 shows results for the cross task, designed to test whether forecasts can discern and use the disambiguating feature at the end of one of the hallways, something that the short-action-sequence PSRs should not be able to do. The results show that the task can be solved by all measures with as few as 80 forecast features, while PSRs fall short. FIG. 3 highlights the generalization capability of forecasts in the larger environment. While PSR features start overfitting long before they allow for reasonable performance (50% states going off the chart in the upper left graph), forecast features generalize very well: performance degrades only minimally, even when half the states are never seen (upper right graph). However, generalization is severely impaired, both for PSRs and forecasts, when class features formed by state aggregation are used instead (bottom two plots).

FIGS. 2 and 3 show that as new forecasts are added, approximation of the value function steadily improves and average reward steadily increases, even though the reward signal plays no role in the construction of the forecasts. The agent's immediate sensorimotor stream is minimally informative, yet forecasts are able to produce features that distinguish subtle spatial structures. Furthermore, they can carry this information to distant states, allowing the agent to distinguish regions of the world that are nearly identical (in the sense that they generate identical responses to all short and medium-length sequences of actions). In order to choose the best action in most of the states of Task 1, it is essential for the agent to know which arm of the cross it is in, yet the only information that can distinguish the arms is located at the distant end of one arm. It is surprising both how readily forecasts are able to capture this information and how easily they are then able to use it to distinguish all the states of the MDP. In the case of PSRs, it is clear from FIG. 2 that a very large number of features must be constructed in shortest-first order before this kind of information will be available everywhere in the MDP. Furthermore, there is essentially no hope that the fixed-length PSR features found useful for Task 1 would be particularly useful if the length of the arms were extended. In contrast, it seems quite likely that the forecasts generated for a smaller cross would still be useful in a larger one.

FIG. 3 investigated the generalization ability of forecasts and showed that even with exposure to only 50% of the states, the forecast features are sufficient to produce a good policy and to get good evaluation of the value function using a linear function approximator. The similarity of FIGS. 2 and 3 is striking, despite the very different environments.

If the learning agent is a robot that operates in the real world and does not have access to a complete description of the real world, it may need to create forecasts with incomplete information. The version of the above algorithm (i.e., "Algorithm 1") may not be used in this case; it may only be used when all information about the environment is known in advance. A general version may create forecasts as needed at any time step. The system may be set to create a new forecast whenever a specific condition or signal occurs. In a non-limiting example, if there is a large discrepancy between a forecast's estimated (predicted) value at one time step and its estimated (predicted) value at the following time step; this may be an indication that a new forecast should be created to predict the unpredicted forecast value.

The method described in Algorithm 1 is a "batch"-mode (offline) method for constructing forecasts, in which the agent does learning in one large batch (Lines 15 and 16), then creates one or more forecasts (Lines 5-14), then repeats. This batch method also assumes a full model of the environment. However, the general useful case is the "online" case in which none of these restrictions need to apply such as, but not limited to, no batches, no model. Instead, at every time step the agent may choose a single action, then the agent may do a tiny quantum of learning based on that choice, then the agent decides whether or not to create (and/or prune) forecasts; and this process continues at every time step while the agent is in continual, ongoing operation.

The above algorithm (Algorithm 1) creates all possible forecasts in a certain order and leaves them in the system thereafter. This method may be potentially computationally intractable. A better method may be to create only forecasts that are likely to be useful. There may be an unlimited number of possible ways to determine whether a forecast might be useful, any of which could trigger the creation of a single new forecast. Non-limiting examples include:

a) if at time step t there is a large gap (difference) between the estimated (predicted) value of some forecast f and its estimated (predicted) value at the following time step, t+1; this difference may be an indication that a new forecast should be created. In this situation, various different forecasts may be created, including without limitation:

i) A forecast created to predict and (optionally) maximize forecast f's estimated value;

ii) A forecast created to predict and (optionally) maximize the agent's entire state vector (or some subset) as it existed at time step t, the time step preceding the difference;

iii) A forecast created to predict and (optionally) maximize the agent's entire state vector (or some subset) at time step t+1, the time step following the difference;

b) if there is a large sum across all the gaps (differences) between the estimated (predicted) value of all the forecasts at one time step t and their respective values at the following time step, t+1; this large sum may be an indication that a new forecast should be created. In this situation, a variety of possible forecasts might be created as in without limitation a.ii and a.iii.

The advantage of creating forecasts only in response to a specific signal or condition, may be that fewer forecasts are created, leading to greater efficiency.

The above algorithm (Algorithm 1) creates only specific kinds of forecasts in which the "c" and "z" values are fixed (c is always zero, z is zero except at option termination). The general version relaxes that restriction and allows any value for c and z. One non-limiting example where this may be useful is for forecasts that predict how many time steps will elapse until the forecast option terminates, which may be done by setting c to 1 for each time step until option termination. Such forecasts may be useful for predicting how much time will elapse before a specific event occurs, which may be useful, for example, but not limited to, when estimating how far away an object may be from the agent, where the robot/agent may use forecasts to estimate how many steps would be required to reach the object.

In the general version, there may be a condition or signal that would cause the deletion of a forecast (and potentially all forecasts that predict the value of that forecast). This may be used to free up computational resources to, for example, but not limited to, allow creation of other, more useful forecasts. This may be a big advantage where computational capacity is limited.

Figure 4:
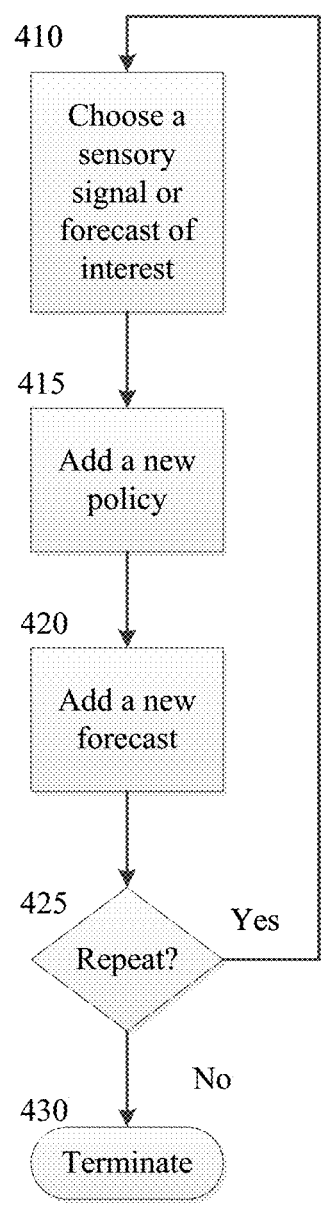
FIG. 4 illustrates a flowchart for an exemplary method for forecast generation, in accordance with an embodiment of the present invention.

FIG. 4 illustrates a flowchart for an exemplary method for forecast generation, in accordance with an embodiment of the present invention. In the present invention, an autonomous agent may include, but not limited to, binary observation signals (O), binary actions (A), calculated features (Φ), existing forecasts (F) and existing policies (P). A calculated feature (Φ) may include an arbitrary function of some combination of observation signals in O and/or other calculated features in Φ and/or estimated (predicted) values of existing forecasts in F. The functions may include for example, but not limited to, sum, average, max, min, or the output of any feedforward or recurrent neural network given these signals and/or forecast values as inputs. The agent's internal state consists of any combination of observation signals (O), calculated features (Φ), and estimated (predicted) values of existing forecasts (F). A policy may map the agent's internal state (including subsets of the agent's state) to actions including without limitation to a probability distributions over actions. In some embodiments, a policy may have one or more sub-policies. In some embodiments, a forecast may be any behavior-dependent, such as, but not limited to, policy dependent, prediction about the agent's future state. In other embodiments, observation signals O may include, without limitation, analog type signals or representations thereof. In other embodiments, actions A may include a servo type of motions or representation thereof. In a step 410, the process automatically chooses, for assignment to a scalar variable v, an observation signal in O, a calculated feature in Φ, or a forecast in F, that has not yet been chosen, where the value of variable v at each time step will be the value of the chosen observation signal, calculated feature, or forecast estimate (prediction) at that time step. In a step 415, a new policy p may be added to policies P. Policy p may map any combination or subset of state values, including observations in O and/or estimated (predicted) values of forecasts in F and/or calculated features in Φ to actions in A, including to probability distributions over A; and p may learn, may have learned, or may be modified to optimize the value of the scalar variable v. Optimization may include, without limitation, maximizing, minimizing, converging, etc. as well as approximations of such optimization. In a step 420, a new forecast f is added to F. In some embodiments, forecast f may include option policy=p, option termination=a value dependent on v, and option initiation set=always/everywhere/anywhere. As a non-limiting example, option termination={a high value if $v>\theta_1$; a low value otherwise}, c=0 everywhere, and z={a high value if $v>\theta_2$; a low value otherwise} for some threshold values $\theta_1$ and $\theta_2$. In a step 425, it is determined whether the process of generating or building a forecast is to continue. The process may terminate at a step 430.

Figure 5:
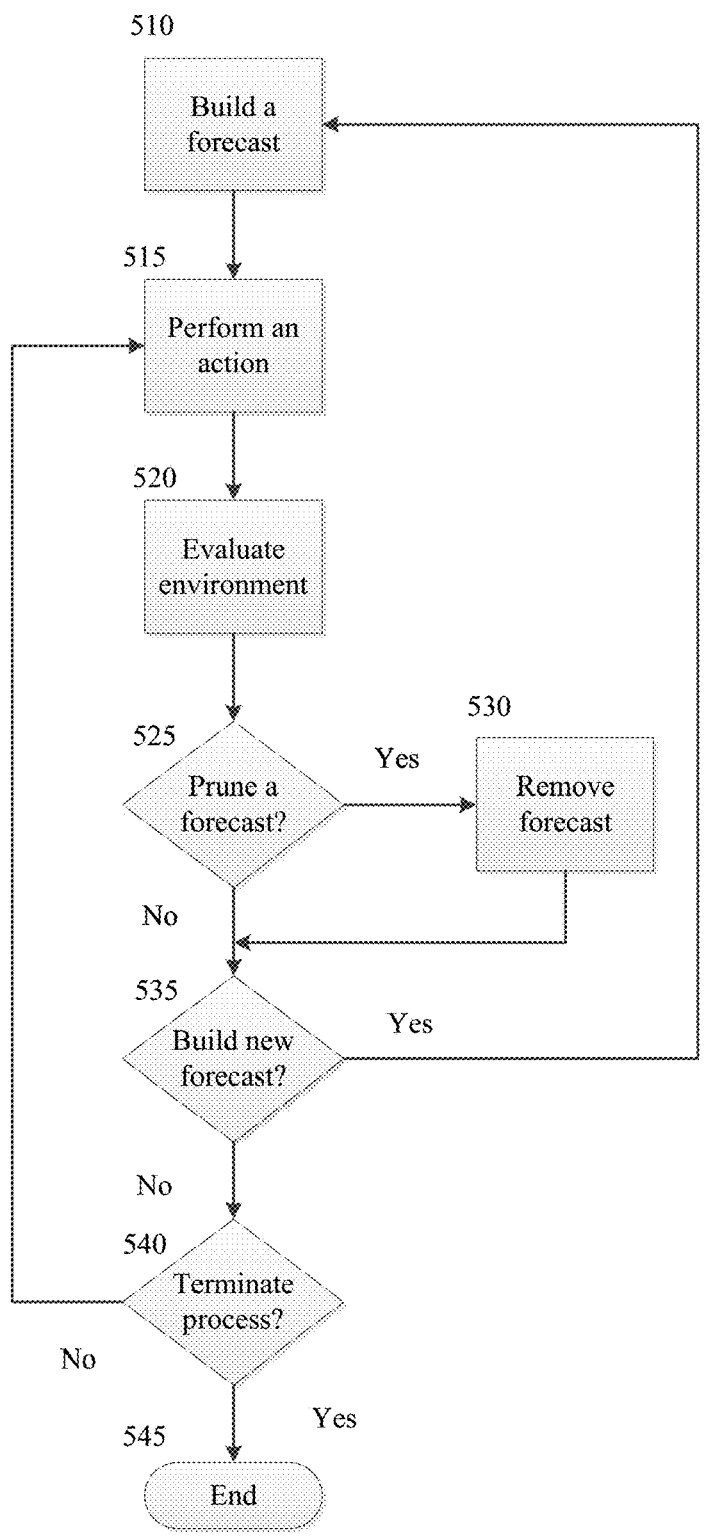
FIG. 5 illustrates a flowchart for an exemplary method of operation with automatic forecast generation, in accordance with an embodiment of the present invention.

FIG. 5 illustrates a flowchart for an exemplary method of operation with automatic forecast generation, in accordance with an embodiment of the present invention. In the present invention, an autonomous agent may include, but not limited to, observation signals (O), actions (A), calculated features (Φ) as above, existing forecasts (F) and existing policies (P). In a step 510, the process may build a forecast. In some embodiments, the process may utilize the process illustrated in FIG. 4 or a variation thereof. In a step 515, the agent may perform an action a in A, possibly according to a policy p in P, associated with a forecast fin F. In a step 520, the agent may evaluate the environment upon completion of the action a, possibly involving receiving and/or updating its observation signals (O), calculated features (Φ) and/or estimated (predicted) values for forecasts (F). In a step 525 it is determined if a forecast is ineffectual and is to be pruned. In a step 530, a pruned forecast is removed from F. In some embodiments, a policy may be removed from P. In some embodiments, forecasts that depend on the existence of the pruned forecast may also be pruned and some additional policies may be removed from P. In a step 535, a determination for building a new forecast is made. In a step 540, a determination for terminating the process is made. The process may terminate in a step 545.

In other embodiments, teaching of the present invention are contemplated for use in any control process that can be described in terms of an agent interacting with an environment in which the agent should learn about how it can interact with its environment and in which it is useful to predict and optimize the (long- and short-term) consequences of its actions, especially when it is useful for the agent to build on top of its previous learning, learning new knowledge and behaviors on top of its previous knowledge and behaviors. In some embodiments, one entity may generate/create new forecast/GVFs while another entity could test them, another entity could prune away ineffective forecasts/GVFs, another entity could train/learn the parameters of the forecasts/GVFs, and another entity could use the resulting forecasts/GVFs.

In alternative embodiments, a plurality of agents may use forecasts to work in concert to perform a task. In other alternative embodiments, a plurality of agents may communicate synchronously or asynchronously with each other to, without limitation, generate, test, prune, learn, use, etc. the forecasts to perform a task. In other alternate embodiments, one or more agents may communicate with a server system for storage of forecasts. In yet other alternate embodiments, one or more agents may communicate with a cloud computing system where the cloud computing system processes sensor signals from the agents, generates forecasts and policies, and instructs the agents to perform actions. In yet some other alternate embodiments, one or more agents may forecast to operate as a virtual agent in a virtual world. In still some other alternate embodiments, one or more agents may use forecasts to operate on stored data such as, but not limited to, searching or mining databases.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 6:
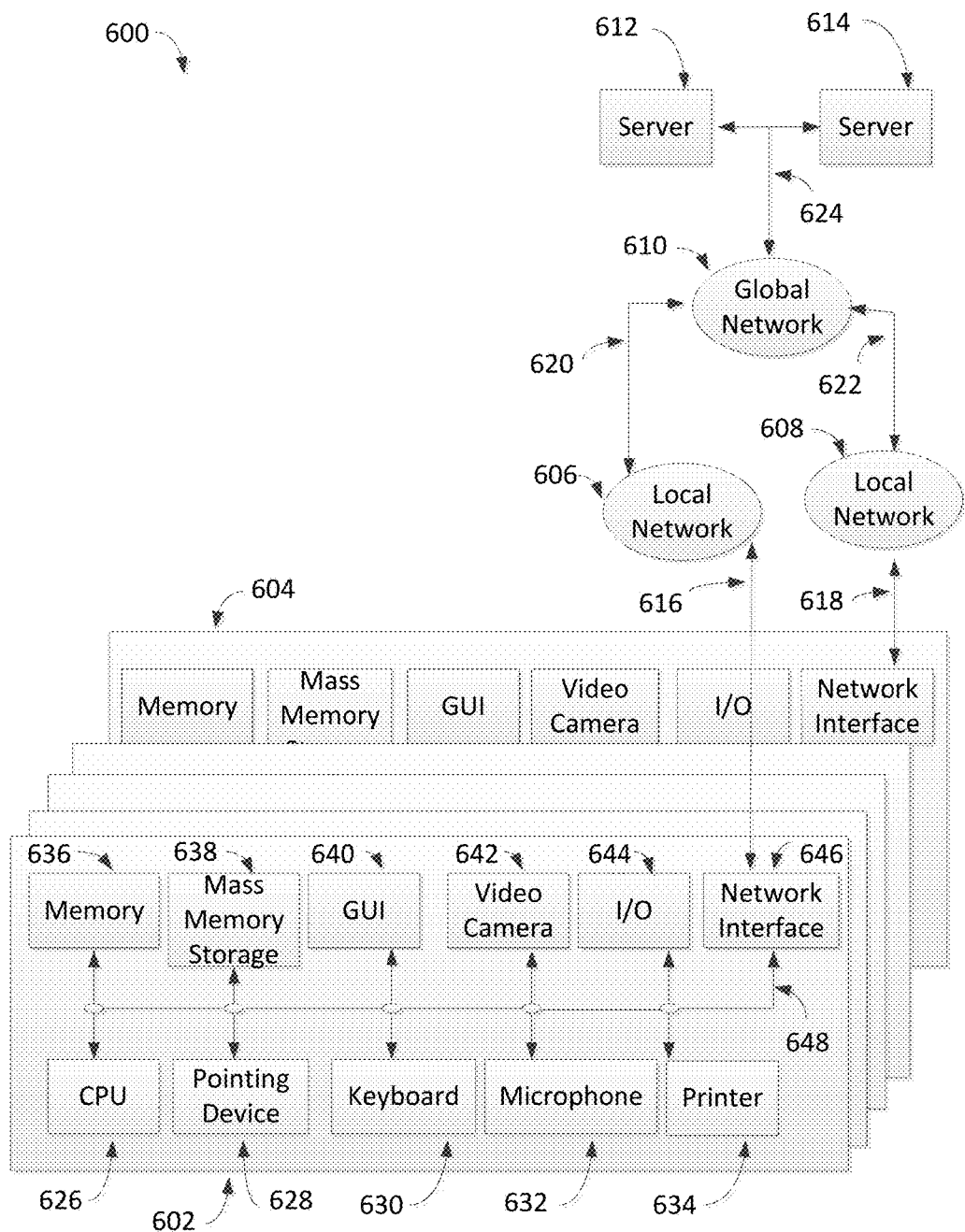
FIG. 6 is a block diagram depicting an exemplary client/server system which may be used by an exemplary web-enabled/networked embodiment of the present invention.

FIG. 6 is a block diagram depicting an exemplary client/server system which may be used by an exemplary web-enabled/networked embodiment of the present invention.

A communication system 600 includes a multiplicity of clients with a sampling of clients denoted as a client 602 and a client 604, a multiplicity of local networks with a sampling of networks denoted as a local network 606 and a local network 608, a global network 610 and a multiplicity of servers with a sampling of servers denoted as a server 612 and a server 614.

Client 602 may communicate bi-directionally with local network 606 via a communication channel 616. Client 604 may communicate bi-directionally with local network 608 via a communication channel 618. Local network 606 may communicate bi-directionally with global network 610 via a communication channel 620. Local network 608 may communicate bi-directionally with global network 610 via a communication channel 622. Global network 610 may communicate bi-directionally with server 612 and server 614 via a communication channel 624. Server 612 and server 614 may communicate bi-directionally with each other via communication channel 624. Furthermore, clients 602, 604, local networks 606, 608, global network 610 and servers 612, 614 may each communicate bi-directionally with each other.

In one embodiment, global network 610 may operate as the Internet. It will be understood by those skilled in the art that communication system 600 may take many different forms. Non-limiting examples of forms for communication system 600 include local area networks (LANs), wide area networks (WANs), wired telephone networks, wireless networks, or any other network supporting data communication between respective entities.

Clients 602 and 604 may take many different forms. Non-limiting examples of clients 602 and 604 include personal computers, personal digital assistants (PDAs), cellular phones and smartphones.

Client 602 includes a CPU 626, a pointing device 628, a keyboard 630, a microphone 632, a printer 634, a memory 636, a mass memory storage 638, a GUI 640, a video camera 642, an input/output interface 644 and a network interface 646.

CPU 626, pointing device 628, keyboard 630, microphone 632, printer 634, memory 636, mass memory storage 638, GUI 640, video camera 642, input/output interface 644 and network interface 646 may communicate in a unidirectional manner or a bi-directional manner with each other via a communication channel 648. Communication channel 648 may be configured as a single communication channel or a multiplicity of communication channels.

CPU 626 may be comprised of a single processor or multiple processors. CPU 626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 636 is used typically to transfer data and instructions to CPU 626 in a bi-directional manner. Memory 636, as discussed previously, may include any suitable computer-readable media, intended for data storage, such as those described above excluding any wired or wireless transmissions unless specifically noted. Mass memory storage 638 may also be coupled bi-directionally to CPU 626 and provides additional data storage capacity and may include any of the computer-readable media described above. Mass memory storage 638 may be used to store programs, data and the like and is typically a secondary storage medium such as a hard disk. It will be appreciated that the information retained within mass memory storage 638, may, in appropriate cases, be incorporated in standard fashion as part of memory 636 as virtual memory.

CPU 626 may be coupled to GUI 640. GUI 640 enables a user to view the operation of computer operating system and software. CPU 626 may be coupled to pointing device 628. Non-limiting examples of pointing device 628 include computer mouse, trackball and touchpad. Pointing device 628 enables a user with the capability to maneuver a computer cursor about the viewing area of GUI 640 and select areas or features in the viewing area of GUI 640. CPU 626 may be coupled to keyboard 630. Keyboard 630 enables a user with the capability to input alphanumeric textual information to CPU 626. CPU 626 may be coupled to microphone 632. Microphone 632 enables audio produced by a user to be recorded, processed and communicated by CPU 626. CPU 626 may be connected to printer 634. Printer 634 enables a user with the capability to print information to a sheet of paper. CPU 626 may be connected to video camera 642. Video camera 642 enables video produced or captured by user to be recorded, processed and communicated by CPU 626.

CPU 626 may also be coupled to input/output interface 644 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 626 optionally may be coupled to network interface 646 which enables communication with an external device such as a database or a computer or telecommunications or internet network using an external connection shown generally as communication channel 616, which may be implemented as a hardwired or wireless communications link using suitable conventional technologies. With such a connection, CPU 626 might receive information from the network, or might output information to a network in the course of performing the method steps described in the teachings of the present invention.

Figure 7:
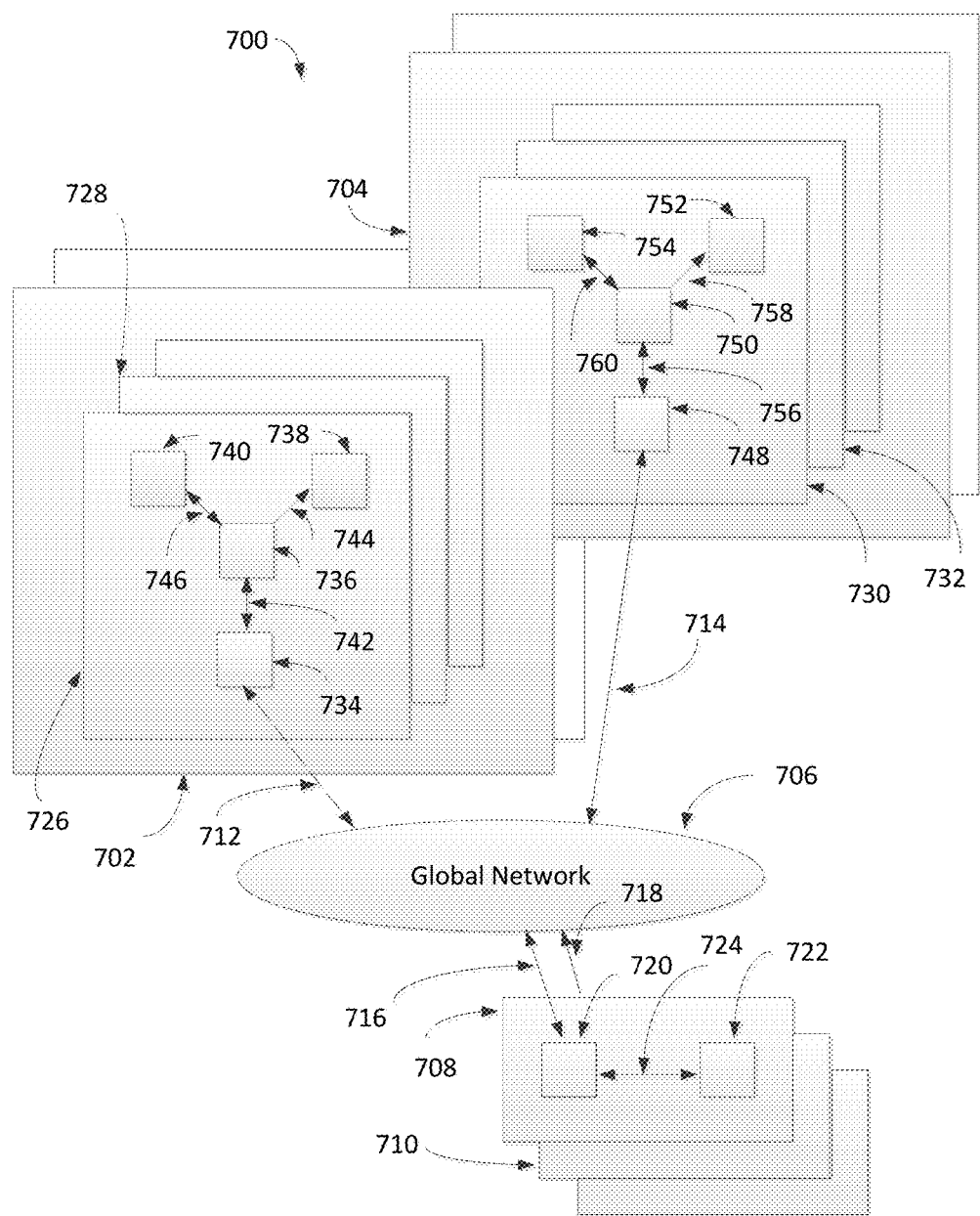
FIG. 7 illustrates a block diagram depicting a conventional client/server communication system.

FIG. 7 illustrates a block diagram depicting a conventional client/server communication system.

A communication system 700 includes a multiplicity of networked regions with a sampling of regions denoted as a network region 702 and a network region 704, a global network 706 and a multiplicity of servers with a sampling of servers denoted as a server device 708 and a server device 710.

Network region 702 and network region 704 may operate to represent a network contained within a geographical area or region. Non-limiting examples of representations for the geographical areas for the networked regions may include postal zip codes, telephone area codes, states, counties, cities and countries. Elements within network region 702 and 704 may operate to communicate with external elements within other networked regions or within elements contained within the same network region.

In some implementations, global network 706 may operate as the Internet. It will be understood by those skilled in the art that communication system 700 may take many different forms. Non-limiting examples of forms for communication system 700 include local area networks (LANs), wide area networks (WANs), wired telephone networks, cellular telephone networks or any other network supporting data communication between respective entities via hardwired or wireless communication networks. Global network 706 may operate to transfer information between the various networked elements.

Server device 708 and server device 710 may operate to execute software instructions, store information, support database operations and communicate with other networked elements. Non-limiting examples of software and scripting languages which may be executed on server device 708 and server device 710 include C, C++, C# and Java.

Network region 702 may operate to communicate bi-directionally with global network 706 via a communication channel 712. Network region 704 may operate to communicate bi-directionally with global network 706 via a communication channel 714. Server device 708 may operate to communicate bi-directionally with global network 706 via a communication channel 716. Server device 710 may operate to communicate bi-directionally with global network 706 via a communication channel 718. Network region 702 and 704, global network 706 and server devices 708 and 710 may operate to communicate with each other and with every other networked device located within communication system 700.

Server device 708 includes a networking device 720 and a server 722. Networking device 720 may operate to communicate bi-directionally with global network 706 via communication channel 716 and with server 722 via a communication channel 724. Server 722 may operate to execute software instructions and store information.

Network region 702 includes a multiplicity of clients with a sampling denoted as a client 726 and a client 728. Client 726 includes a networking device 734, a processor 736, a GUI 738 and an interface device 740. Non-limiting examples of devices for GUI 738 include monitors, televisions, cellular telephones, smartphones and PDAs (Personal Digital Assistants). Non-limiting examples of interface device 740 include pointing device, mouse, trackball, scanner and printer. Networking device 734 may communicate bi-directionally with global network 706 via communication channel 712 and with processor 736 via a communication channel 742. GUI 738 may receive information from processor 736 via a communication channel 744 for presentation to a user for viewing. Interface device 740 may operate to send control information to processor 736 and to receive information from processor 736 via a communication channel 746. Network region 704 includes a multiplicity of clients with a sampling denoted as a client 730 and a client 732. Client 730 includes a networking device 748, a processor 750, a GUI 752 and an interface device 754. Non-limiting examples of devices for GUI 738 include monitors, televisions, cellular telephones, smartphones and PDAs (Personal Digital Assistants). Non-limiting examples of interface device 740 include pointing devices, mousse, trackballs, scanners and printers. Networking device 748 may communicate bi-directionally with global network 706 via communication channel 714 and with processor 750 via a communication channel 756. GUI 752 may receive information from processor 750 via a communication channel 758 for presentation to a user for viewing. Interface device 754 may operate to send control information to processor 750 and to receive information from processor 750 via a communication channel 760.

For example, consider the case where a user interfacing with client 726 may want to execute a networked application. A user may enter the IP (Internet Protocol) address for the networked application using interface device 740. The IP address information may be communicated to processor 736 via communication channel 746. Processor 736 may then communicate the IP address information to networking device 734 via communication channel 742. Networking device 734 may then communicate the IP address information to global network 706 via communication channel 712. Global network 706 may then communicate the IP address information to networking device 720 of server device 708 via communication channel 716. Networking device 720 may then communicate the IP address information to server 722 via communication channel 724. Server 722 may receive the IP address information and after processing the IP address information may communicate return information to networking device 720 via communication channel 724. Networking device 720 may communicate the return information to global network 706 via communication channel 716. Global network 706 may communicate the return information to networking device 734 via communication channel 712. Networking device 734 may communicate the return information to processor 736 via communication channel 742. Processor 776 may communicate the return information to GUI 778 via communication channel 744. User may then view the return information on GUI 738.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing predictive knowledge structures according to the present invention will be apparent to those skilled in the art. Various aspects of the invention have been described above by way of illustration, and the specific embodiments disclosed are not intended to limit the invention to the particular forms disclosed. The particular implementation of the predictive knowledge structures may vary depending upon the particular context or application. By way of example, and not limitation, the predictive knowledge structures described in the foregoing were principally directed to artificial intelligence implementations; however, similar techniques may instead be applied to any autonomous system, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
   building a forecast for an autonomous agent, said building at least comprising:
      selecting a policy from a set of policies, said policy mapping states of said autonomous agent to actions of said autonomous agent; and
      automatically choosing and adding a new forecast to a set of forecasts, said new forecast at least comprising a prediction regarding future states of said autonomous agent during execution and termination of said policy based on a closed-loop sequence of actions, where the policy is considered with conditions for termination of the policy;
   evaluating a state of said autonomous agent following termination of said policy, said evaluation at least comprising comparing said state with said prediction;
   creating a new policy that optimizes a function over observable signals and forecasts;
   building a further new forecast, said further new forecast at least comprising a further prediction regarding future states of said autonomous agent during execution and termination of said new policy based on a closed-loop sequence of actions, where the new policy is considered with conditions for termination of the new policy;
   evaluating a state of said autonomous agent following termination of said new policy, said evaluation at least comprising comparing said state with said further prediction; and
   determining whether to build an additional forecast, said determining optionally at least in part based on said evaluation.

2. The method as recited in claim 1, further comprising the steps of:
   determining if said forecast is ineffective; and pruning said forecast from said set of forecasts upon said determination.

3. The method as recited in claim 1, in which said building the forecast further comprises:
   building a new policy, said building at least comprising:
      selecting a state value of said autonomous agent; and
      adding a new policy to the set of policies, said new policy mapping states of said autonomous agent to actions of said autonomous agent, said actions optimizing said state value.

4. The method as recited in claim 1, in which said set of forecasts comprises a hierarchical structure.

5. The method as recited in claim 3, in which said new policy further comprises starting and stopping criteria.

6. The method as recited in claim 1, in which a state, set of states or state value predicted by any forecast in said set of forecasts is associated with at least one of said policies in said set of policies.

7. The method as recited in claim 3, in which said selected state value comprises at least one of an observation signal, a forecast of interest, a function of a combination of observation signals, and a function of forecast values in said set of forecasts.

8. The method as recited in claim 1, in which said step of determining whether to terminate the policy is further based on a threshold value.

9. The method as recited in claim 1, in which said set of forecasts and said set of policies comprise a hierarchical structure.

10. A method comprising:
   steps for building a forecast for an autonomous agent, said steps for building at least comprising selecting a policy from a set of policies, said policy mapping states of said autonomous agent to actions of said autonomous agent, and automatically choosing and adding a new forecast to a set of forecasts, said new forecast at least comprising a prediction regarding future states of said autonomous agent during execution and termination of said policy based on a closed-loop sequence of actions, where the policy is considered with conditions for termination of the policy;
   steps for evaluating a state of said autonomous agent following termination of said policy;
   steps for creating a new policy that optimizes a function over observable signals and forecasts;
   steps for building a further new forecast, said further new forecast at least comprising a further prediction regarding future states of said autonomous agent during execution and termination of said new policy based on a closed-loop sequence of actions, where the new policy is considered with conditions for termination of the new policy;
   steps for evaluating a state of said autonomous agent following termination of said new policy, said evaluation at least comprising comparing said state with said further prediction; and
   steps for determining whether to build an additional forecast.

11. The method as recited in claim 10, further comprising:
   steps for determining if said forecast is ineffective; steps for pruning said forecast from said set of forecasts upon said determination.

12. A non-transitory computer-readable storage medium with an executable program stored thereon, wherein the program instructs one or more processors to perform the following steps:
   building a forecast for an autonomous agent, said building at least comprising:
      selecting a policy from a set of policies, said policy mapping states of said autonomous agent to actions of said autonomous agent; and
      automatically choosing and adding a new forecast to a set of forecasts, said new forecast at least comprising a prediction regarding future states of said autonomous agent during execution and termination of said policy based on a closed-loop sequence of actions, where the policy is considered with conditions for termination of the policy;
   evaluating a state of said autonomous agent following termination of said policy, said evaluation at least comprising comparing said state with said prediction;
   creating a new policy that optimizes a function over observable signals and forecasts;
   building a further new forecast, said further new forecast at least comprising a further prediction regarding future states of said autonomous agent during execution and termination of said new policy based on a closed-loop sequence of actions, where the new policy is considered with conditions for termination of the new policy;
   evaluating a state of said autonomous agent following termination of said new policy, said evaluation at least comprising comparing said state with said further prediction; and
   determining whether to build an additional forecast, said determining optionally based at least in part on said evaluation.

13. The program instructing the one or more processors as recited in claim 12, further comprising the steps of: determining if said forecast is ineffective; and pruning said forecast from said set of forecasts upon said determination.

14. The program instructing the one or more processors as recited in claim 12, in which said building the forecast further comprises:
   building a new policy, said building at least comprising:
      selecting a state value of said autonomous agent; and
      adding a new policy to the set of policies, said new policy mapping states of said autonomous agent to actions of said autonomous agent, said actions optimizing said state value.

15. The program instructing the one or more processors as recited in claim 12, in which said set of forecasts comprises a hierarchical structure.

16. The program instructing the one or more processors as recited in claim 14, in which said new policy further comprises starting and stopping criteria.

17. The program instructing the one or more processors as recited in claim 12, in which a state, set of states or state value predicted by any forecast in said set of forecasts is associated with at least one of said policies in said set of policies.

18. The program instructing the one or more processors as recited in claim 14, in which said selected state value comprises at least one of an observation signal, a forecast of interest, a function of a combination of observation signals, and a function of forecast values in said set of forecasts.

19. The program instructing the one or more processors as recited in claim 14, in which said step of determining whether to terminate the policy is further based on a threshold value.

20. The program instructing the one or more processors as recited in claim 12, in which said set of forecasts and said set of policies comprise a hierarchical structure.

* * * * *